(12) United States Patent
Kawakami et al.

(10) Patent No.: US 10,300,534 B2
(45) Date of Patent: May 28, 2019

(54) DRILL

(71) Applicant: SUMITOMO ELECTRIC HARDMETAL CORP., Itami-shi (JP)

(72) Inventors: Yuma Kawakami, Itami (JP); Daisuke Murakami, Itami (JP); Masaaki Jindai, Itami (JP); Keiji Kinoshita, Itami (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 0 days.

(21) Appl. No.: 15/504,484

(22) PCT Filed: Aug. 19, 2015

(86) PCT No.: PCT/JP2015/073223
§ 371 (c)(1),
(2) Date: Feb. 16, 2017

(87) PCT Pub. No.: WO2016/042967
PCT Pub. Date: Mar. 24, 2016

(65) Prior Publication Data
US 2017/0232529 A1    Aug. 17, 2017

(30) Foreign Application Priority Data

Sep. 18, 2014  (JP) .................................. 2014-189933

(51) Int. Cl.
*B23B 51/02* (2006.01)
*B23B 51/00* (2006.01)

(52) U.S. Cl.
CPC .............. *B23B 51/02* (2013.01); *B23B 51/00* (2013.01); *B23B 2251/04* (2013.01);
(Continued)

(58) Field of Classification Search
CPC ................ B23B 51/02; B23B 2251/08; B23B 2251/082; B23B 2251/085;
(Continued)

(56) References Cited

U.S. PATENT DOCUMENTS

| 2,646,701 A | * | 7/1953 | Letien | ..................... B23B 51/02 408/223 |
| 4,802,799 A | * | 2/1989 | Rachev | ................... B23B 51/02 407/100 |

(Continued)

FOREIGN PATENT DOCUMENTS

| CN | 102632277 A | 8/2012 |
| DE | 3730377 A1 * | 3/1989 ............. B23B 51/02 |

(Continued)

OTHER PUBLICATIONS

International Search Report in counterpart International Application No. PCT/JP2015/073223, dated Sep. 15, 2015.

*Primary Examiner* — Daniel W Howell
*Assistant Examiner* — Chwen-Wei Su
(74) *Attorney, Agent, or Firm* — Baker Botts L.L.P.; Michael A. Sartori

(57) ABSTRACT

Provided is a drill having a flat-shaped drill tip and excellent in cutting edge strength and chip removability. The drill includes: a cutting edge extending in a direction at an angle α of not less than 85° and not more than 90° with respect to a drill axis (line O-O); a flank face contiguous to the cutting edge and having a clearance angle β of not less than 5° and not more than 10° with respect to the drill axis (line O-O); and a rake face located opposite to the flank face across the cutting edge, the cutting edge includes a recess receding in a direction parallel to the drill axis (line O-O), and the rake face includes a front clearance formed at a side of an outer periphery of the drill.

4 Claims, 4 Drawing Sheets

(52) U.S. Cl.
CPC ....... *B23B 2251/08* (2013.01); *B23B 2251/14* (2013.01); *B23B 2251/18* (2013.01); *Y10T 408/9097* (2015.01)

(58) Field of Classification Search
CPC ............. B23B 2251/18; Y10T 408/905; Y10T 408/906; Y10T 408/9097; Y10T 408/909
See application file for complete search history.

(56) References Cited

U.S. PATENT DOCUMENTS

| | | | | |
|---|---|---|---|---|
| 5,011,342 | A | * | 4/1991 | Hsu .......................... B23B 51/02 |
| | | | | 408/224 |
| 5,452,971 | A | * | 9/1995 | Nevills .................... B23B 51/00 |
| | | | | 408/229 |
| 6,135,681 | A | * | 10/2000 | Nuzzi ................. B23B 51/0009 |
| | | | | 407/116 |
| 6,371,702 | B1 | * | 4/2002 | DeWald, Jr. ........ B23B 51/0009 |
| | | | | 408/227 |
| 2007/0134071 | A1 | | 6/2007 | Reinhardt et al. |
| 2008/0003072 | A1 | | 1/2008 | Kim et al. |
| 2008/0166196 | A1 | * | 7/2008 | Zhu .......................... B23B 51/02 |
| | | | | 408/230 |
| 2009/0317202 | A1 | * | 12/2009 | Zhu .......................... B23B 51/02 |
| | | | | 408/230 |
| 2012/0201619 | A1 | | 8/2012 | Olsson |

FOREIGN PATENT DOCUMENTS

| | | | | |
|---|---|---|---|---|
| DE | 102010048331 A1 | * | 1/2012 | ............. B23B 51/02 |
| EP | 2484470 A1 | | 8/2012 | |
| JP | 2004-141970 A | | 5/2004 | |
| JP | 2008-500190 A | | 1/2008 | |
| JP | 2009-056534 A | | 3/2009 | |
| JP | 2012-161912 A | | 8/2012 | |
| JP | 2014000642 A | * | 1/2014 | |

\* cited by examiner

DRILL

TECHNICAL FIELD

The present invention relates to a drill, and more specifically relates to a drill having a flat-shaped tip.

BACKGROUND ART

Drills having the point angle set to 120° to 140° are provided as a standard model.

Such drills, however, have a problem of low accuracy of the hole position when the drill bites a non-flat surface such as inclined surface in processing the non-flat surface. Thus, drills suitable for processing a non-flat surface have been developed.

Japanese Patent Laying-Open No. 2004-141970 (PTD 1) discloses a drill having a point angle of 170° to 180° as a drill for drilling a hole in an inclined surface.

Japanese Patent Laying-Open No. 2009-56534 (PTD 2) discloses a drill functioning as a counterbore drill for drilling a guide hole or performing boring as preprocessing before drilling a hole in an inclined surface. The counterbore drill has a point angle of 170° to 190°, and includes two secondary cutting edges extending outward from the chisel through thinning, a primary cutting edge in a concave shape extending outward from each secondary cutting edge, and an outer cutting edge extending from each primary cutting edge to a leading edge and receding in the rotational direction of the drill. The outer cutting edge has a receding angle of −1° to −20°.

A drilling operation in a workpiece by a drill of a standard model forms a blind hole with a cone-shaped bottom. For certain applications, however, blind holes with a flat bottom are desired. For such applications, Japanese National Patent Publication No. 2008-500190 (PTD 3) discloses a drill having a point angle of 180°.

CITATION LIST

Patent Document

PTD 1: Japanese Patent Laying-Open No. 2004-141970
PTD 2: Japanese Patent Laying-Open No. 2009-56534
PTD 3: Japanese National Patent Publication No. 2008-500190

SUMMARY OF INVENTION

Technical Problem

The technique of Japanese Patent Laying-Open No. 2004-141970 (PTD 1) has a problem that the drill is likely to be damaged due to a heavy load on the outer peripheral portion of the drill tip, because the drill tip has a concave shape. The technique of Japanese Patent Laying-Open No. 2009-56534 (PTD 2) also has a problem that the drill is likely to be damaged due to a heavy load on the outer peripheral portion of the drill tip if the point angle is more than 180°.

Moreover, the technique of Japanese National Patent Publication No. 2008-500190 (PTD 3) has a problem of low chip removability due to less influence of a chip flute on chip disposal because the drill tip is a linear cutting edge with a point angle of 180°.

In view of this, an object of the present invention is to provide a drill having a flat-shaped drill tip and excellent in cutting edge strength and chip removability.

Solution To Problem

A drill according to an aspect of the present invention is (1) a drill including: a cutting edge extending in a direction at an angle of not less than 85° and not more than 90° with respect to a drill axis; a flank face contiguous to the cutting edge and having a clearance angle of not less than 5° and not more than 10° with respect to a perpendicular to the drill axis; and a rake face located opposite to the flank face across the cutting edge, the cutting edge includes a recess receding in a direction parallel to the drill axis, and the rake face includes a front clearance formed at a side of an outer periphery of the drill.

Advantageous Effects of Invention

According to the above-described aspect, a drill having a flat-shaped drill tip and excellent in cutting edge strength and chip removability can be provided.

DESCRIPTION OF EMBODIMENTS

[Description of Embodiments of the Invention]
Initially, aspects of the present invention will be described one by one.

A drill according to an aspect of the present invention is
(1) a drill including: a cutting edge extending in a direction at an angle of not less than 85° and not more than 90° with respect to a drill axis; a flank face contiguous to the cutting edge and having a clearance angle of not less than 5° and not more than 10° with respect to a perpendicular to the drill axis; and a rake face located opposite to the flank face across the cutting edge, the cutting edge including a recess receding in a direction parallel to the drill axis, and the rake face including a front clearance formed at a side of an outer periphery of the drill. Accordingly, a drill having a flat-shaped drill tip and excellent in cutting edge strength and chip removability can be provided.

(2) Preferably, the rake face includes a thinning portion formed at a side of the drill axis. Accordingly, the chip removability, the cutting edge strength, and biting of the drill are improved.

(3) Preferably, the recess has a width of not less than 50% and not more than 70% of a width of a part of the cutting edge from the drill axis to an outer peripheral end of the drill. Accordingly, the cutting edge strength and the chip removability of the drill are improved.

(4) Preferably, the recess has a depth of not less than 2% and not more than 5% of a diameter of the drill. Accordingly, the cutting edge strength and the chip removability of the drill are improved.

(5) Preferably, the thinning portion includes a linear portion and a curved portion as seen from above a tip of the drill, the linear portion is shaped to extend beyond the drill axis, and an outer end of the curved portion is located inside the outer periphery of the drill. Accordingly, the stiffness of the drill is improved and the stability during processing by the drill is enhanced.

(6) Preferably, the linear portion of the thinning portion is formed in parallel with the front clearance as seen from above the tip of the drill. Accordingly, the cutting edge strength is improved while the chip removability is maintained.

[Details of Embodiments of the Invention]

A specific example of the drill according to an embodiment of the present invention will hereinafter be described with reference to the drawings.

Figure 1:
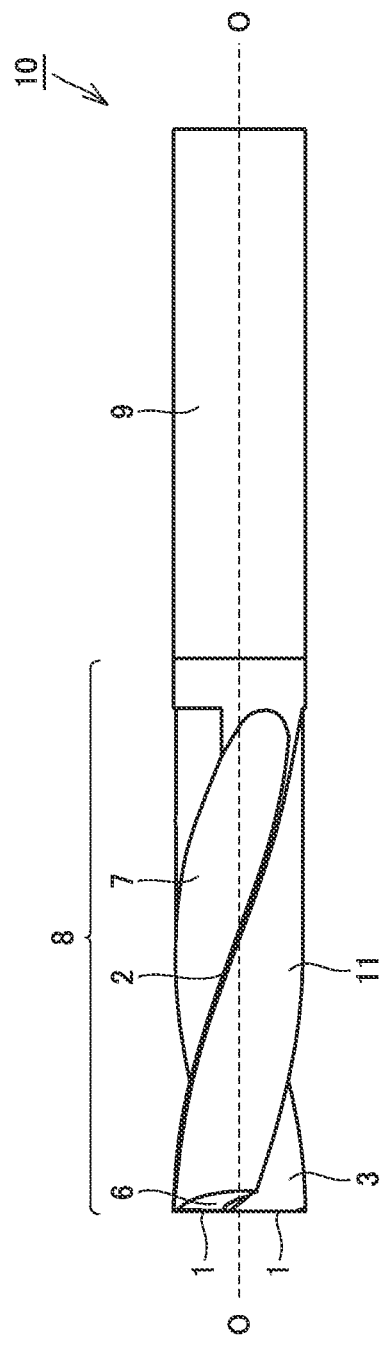
FIG. 1 is a side view illustrating a representative example of the structure of a drill according to an aspect of the present invention.
Figure 2:
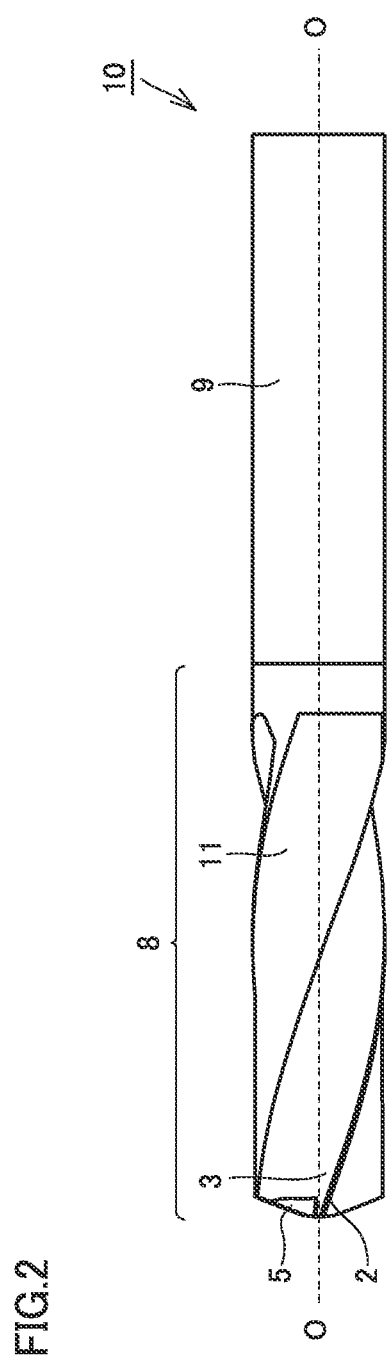
FIG. 2 is a side view of the drill shown in FIG. 1 rotated 90° about a drill axis indicated by the line O-O.
Figure 3:
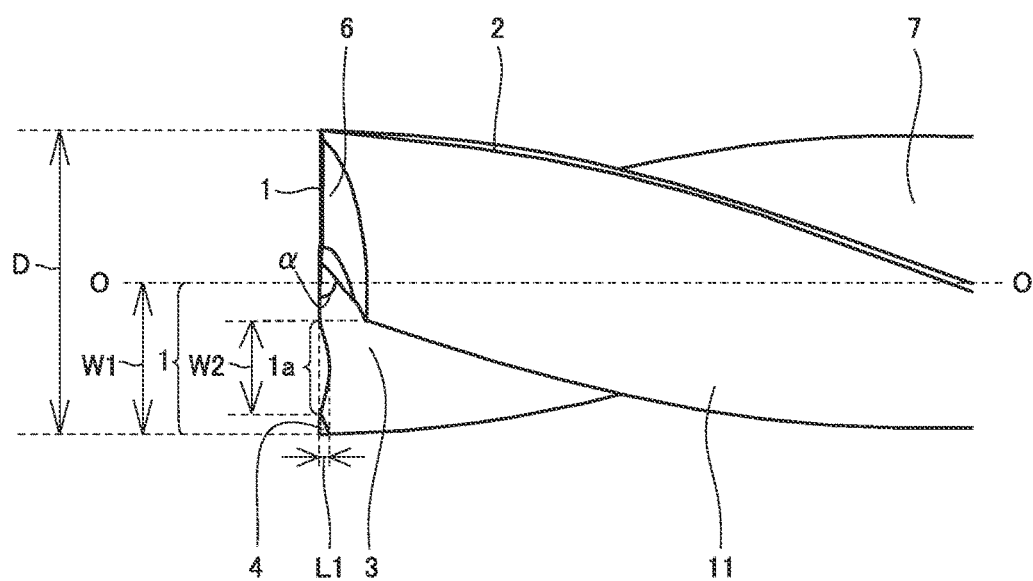
FIG. 3 is an enlarged side view of a tip portion of the drill shown in FIG. 1.
Figure 4:
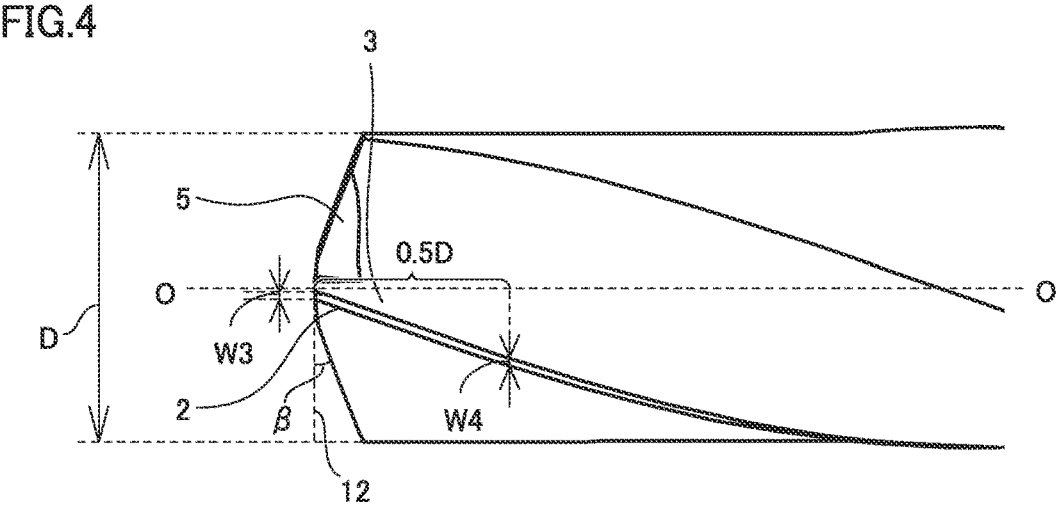
FIG. 4 is an enlarged side view of the tip portion of the drill shown in FIG. 2.
Figure 5:
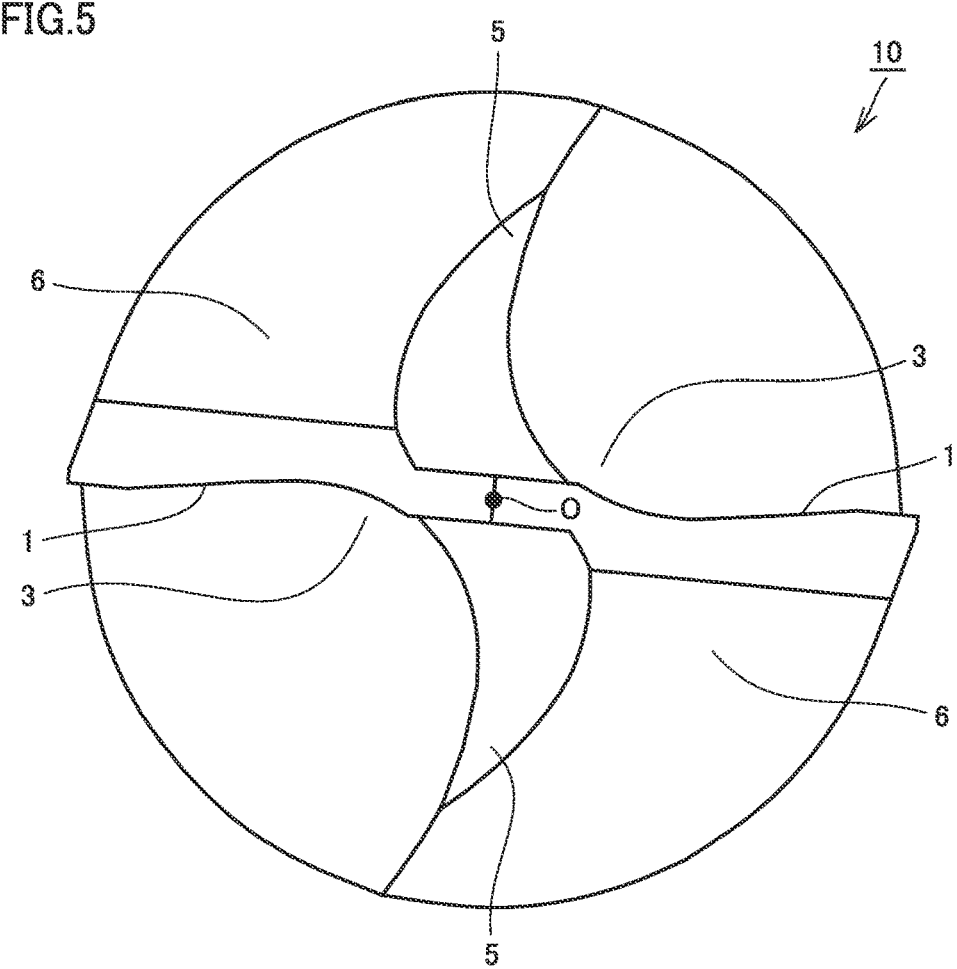
FIG. 5 is an enlarged front view of the tip portion of the drill shown in FIG. 1.

FIG. 1 is a side view illustrating a representative example of the structure of a drill according to an aspect of the present invention. FIG. 2 is a side view of the drill shown in FIG. 1 rotated 90° about a drill axis (line O-O). FIG. 3 is an enlarged side view of a tip portion of the drill shown in FIG. 1. FIG. 4 is an enlarged side view of the tip portion of the drill shown in FIG. 2. FIG. 5 is an enlarged front view of the tip portion of the drill shown in FIG. 1.

A drill 10 according to an embodiment of the present invention includes a drill shank 9 for connecting the drill to a holder, and a body 8 formed contiguously to the top end of drill shank 9. Body 8 has a side surface in the longitudinal direction. In the side surface, a spirally twisted flute 7 is formed and an outer peripheral portion 11 smaller in depth than the twisted flute is formed along twisted flute 7. Twisted flute 7 opens at the drill tip. A part of the boundary of the opening forms a cutting edge 1. Another part of the boundary of the opening is contiguous to a flank face 6. The boundary between twisted flute 7 and outer peripheral portion 11 includes a part which is contiguous to cutting edge 1. At this part of the boundary, a margin 2 is formed. An inwardly curved surface forms twisted flute 7. The inwardly curved surface near cutting edge 1 is a rake face 3. At the drill tip, a part of rake face 3 at a side of the drill axis is cut to form a thinning portion 5. The outer peripheral edge corner of rake face 3 is chamfered to form a front clearance 4.

Thinning portion 5 includes a linear portion and a curved portion. The linear portion is formed beyond the drill axis. An outer end of the curved portion is formed to be located inside the outer periphery of the drill. Accordingly, the stiffness of the drill is improved and the stability during processing by the drill is enhanced.

Drill 10 includes cutting edge 1 extending in a direction at an angle of not less than 85° and not more than 90° with respect to the drill axis (line O-O). Cutting edge 1 includes two cutting edges connected to each other in the vicinity of the drill axis (line O-O). Drill 10 is a drill whose cutting edge has a flat shape or a very gentle convex shape. Therefore, drilling and counterboring in a non-flat surface such as inclined surface and cylindrical surface can be performed with high accuracy. Further, cross-hole drilling, tapping, and intermittent drilling can be performed with high accuracy. Moreover, generation of a burr at the opening of the hole during drilling can be suppressed. The drill axis (line O-O) herein refers to the line extending through the center of the drill in the longitudinal direction of the drill. Cutting edge 1 extending in a direction at an angle of not less than 85° and not more than 90° with respect to the drill axis (line O-O) means that the angle α (see FIG. 3) formed by the drill axis (line O-O) and cutting edge 1 is not less than 85° and not more than 90°. If angle α is less than 85°, it is difficult to accurately perform drilling and counterboring in a non-flat surface such as inclined surface and cylindrical surface. In contrast, if angle α is more than 90°, the cutting edge strength decreases.

Drill 10 includes flank face 6 which is contiguous to cutting edge 1 and has a clearance angle β of not less than 5° and not more than 10° with respect to a perpendicular to the drill axis (line O-O). Accordingly, the drill has high wear resistance and high chipping resistance. Clearance angle β herein refers to the angle β (see FIG. 4) formed by flank face 6 and a perpendicular 12 to the drill axis (line O-O). If clearance angle β is less than 5°, the clearance between the drill and the workpiece is smaller and thus wear of the cutting edge increases rapidly, resulting in decrease of the wear resistance. In contrast, if clearance angle β is more than 10°, the strength of cutting edge 1 is insufficient and thus chipping is apt to occur, resulting in decrease of the chipping resistance.

Cutting edge 1 includes a recess 1a receding in a direction parallel to the drill axis (line O-O) as drill 10 is seen sideways. Recess 1a recedes from the top of cutting edge 1 and forms an arc shape as drill 10 is seen sideways. The shape of recess 1a is not particularly limited.

As drill 10 is seen sideways, the width W2 (hereinafter also referred to as W2) of recess 1a is preferably not less than 50% and not more than 70% of the width W1 (hereinafter also referred to as W1) of a part of cutting edge 1 from the drill axis (line O-O) to the outer peripheral end of the drill, supposing that width W1 is 100%. Width W2 of recess 1a herein refers to the maximum value of the width of recess 1a in the direction in which cutting edge 1 extends. If W2 is less than 50% of W1, the chip removability of the drill decreases. In contrast, if W2 is more than 70% of W1, the cutting edge strength of the drill decreases.

As drill 10 is seen sideways, the depth L1 (hereinafter also referred to as L1) of recess 1a is not less than 2% and not more than 5% of the drill diameter D (hereinafter also referred to as D), supposing that drill diameter D is 100%. Depth L1 of recess 1a herein refers to the maximum value of the depth of recess 1a in the direction along the drill axis (line O-O). If L1 is less than 2% of D, the chip removability of the drill decreases. In contrast, if L1 is more than 5% of D, the cutting edge strength of the drill decreases.

At the drill tip, a part of rake face 3 at a side of the drill axis is cut to form thinning portion 5. Accordingly, the chip removability and biting of drill 10 are improved. The shape of thinning portion 5 is not particularly limited, and R-type thinning, S-type thinning, or the like may be used.

At the drill tip, the outer peripheral edge of rake face 3 is chamfered to form front clearance 4. Accordingly, the cutting edge strength of the drill is improved. The shape of front clearance 4 is not particularly limited, and front clearance 4 may have a curve in R shape or a linear shape.

The boundary between twisted flute 7 and outer peripheral portion 11 includes a part which is contiguous to cutting edge 1. At this part of the boundary, margin 2 is formed. Margin 2 at the drill tip has a width W3 (hereinafter also referred to as W3), in the drill's circumferential direction, of preferably not less than 0.05 mm and not more than 0.25 mm. Further, the width W3 is preferably not less than 50% and not more than 70% of a width W4 (hereinafter also referred to as W4) of margin 2 in the drill's circumferential direction, supposing that the width W4 is 100%. The width W4 is located at a distance from the drill tip toward drill shank 9 along the drill axis (line O-O), and this distance is 0.5 times as long as drill diameter D (0.5 D). Accordingly, the cutting edge strength can be improved while the guiding ability of the drill is ensured. If the ratio of W3 to W4 is less than 50%, the guiding ability of the drill decreases. In contrast, if the ratio W3 to W4 is more than 70%, the cutting edge strength of the drill decreases.

Twisted flute 7 has a surface roughness (Ra) of preferably not more than 5 μm. Accordingly, chips flow smoothly and the chip removability of the drill is improved. Further, the drill has an improved resistance to adhesion of the workpiece and is thus applicable to stainless steel. It should be noted that the surface roughness (Ra) is a center-line mean roughness determined by dividing the sum of the area between the center line and the roughness curve on the positive side of the center line and the area between the center line and the roughness curve on the negative side of the center line, by length L.

EXAMPLES

The present invention will be described in further detail in connection with Examples. It should be noted that the present invention is not limited by these Examples.

Example 1

In this example, the influence of width W2 of recess 1a of cutting edge 1 on the chip removability and the cutting edge strength of the drill was examined.

Drills having the body shapes shown in Table 1 were fabricated, and cutting was performed under the following cutting conditions. The chip removability and the cutting edge strength during cutting were evaluated.

<Cutting Conditions>
Material of Workpiece: S50C
Rotational Speed (Cutting Speed): Vc=75 m/min
Feed: f=0.08 mm/rev
Depth of Cut Hole: drill diameter×2 mm
<Evaluated Characteristics>
Chip Removability
Good: Chips were removed without being clogged in the twisted flute.
Poor: Chips were clogged in the twisted flute.
Cutting Edge Strength
Good: Cutting edge was not chipped.
Poor: Cutting edge was chipped.

note 1: "Cutting edge angle (°)" refers to angle α formed by the drill axis (line O-O) and cutting edge 1.

note 2: "Ratio of front clearance (%)" refers to the ratio of the dimension of the front clearance in the direction along cutting edge 1, relative to the width (W1) of the cutting edge from the drill axis (line O-O) to the drill's outer peripheral end, supposing that W1 is 100%.

note 3: "Ratio of recess width (W2/W1) (%)" refers to the ratio of width W2 of the recess to the width (W1) of the cutting edge from the drill axis (line O-O) to the drill's outer peripheral end, supposing that W1 is 100%.

<Results of Evaluation>

Regarding Sample 1-2 and Sample 1-3, the ratio of the recess width (W2/W1) was not less than 50% and not more than 70%, and the chip removability and the cutting edge strength were high.

Regarding Sample 1-1, the recess was not formed in the cutting edge, and the chip removability was insufficient.

Regarding Sample 1-4, the recess was formed in the whole cutting edge, and the cutting edge strength was insufficient.

Example 2

In this example, the influence of the depth (L1) of recess 1a of cutting edge 1 on the chip removability and the cutting edge strength of the drill was examined.

Drills having the body shapes shown in Table 2 were fabricated, and cutting was performed under the following cutting conditions. At this time, the curvature of the cutting edge as seen from above the drill tip was adjusted to change the depth (L1) of recess 1a of cutting edge 1. Then, the chip removability and the cutting edge strength during cutting were evaluated.

<Cutting Conditions>
Material of Workpiece: S50C
Rotational Speed (cutting speed): Vc=75 m/min
Feed: f=0.08 mm/rev
<Evaluated Characteristics>
Chip Removability
Good: Chips were removed without being clogged in the twisted flute.
Poor: Chips were clogged in the twisted flute.
Cutting Edge Strength
Good: Cutting edge was not chipped.

TABLE 1

| | Sample No. | 1-1 | 1-2 | 1-3 | 1-4 |
|---|---|---|---|---|---|
| shape of drill | material of drill | cemented carbide | cemented carbide | cemented carbide | cemented carbide |
| | drill diameter D (mm) | 5 | 5 | 5 | 5 |
| | center thickness of drill (mm) | 0.8 | 0.8 | 0.8 | 0.8 |
| | cutting edge angle α (°) | 90 | 90 | 90 | 90 |
| | clearance angle β (°) | 5 | 5 | 5 | 5 |
| | rake angle (°) | 5 | 5 | 5 | 5 |
| | ratio of front clearance (%) | 20 | 17 | 12 | 0 |
| | W3/W4 (%) | 30 | 50 | 70 | 100 |
| | W4 (mm) | 0.2 | 0.2 | 0.2 | 0.2 |
| | ratio of recess width (W2/W1) (%) | 0 | 50 | 70 | 80 |
| evaluation | chip removability | poor | good | good | good |
| | cutting edge strength | good | good | good | poor |

Fair: Minute chipping occurred.

TABLE 2

| Sample No. | | 2-1 | 2-2 | 2-3 | 2-4 | 2-5 |
|---|---|---|---|---|---|---|
| shape of drill | material of drill | cemented carbide | cemented carbide | cemented carbide | cemented carbide | cemented carbide |
| | drill diameter D (mm) | 5 | 5 | 5 | 5 | 5 |
| | center thickness of drill (mm) | 0.8 | 0.8 | 0.8 | 0.8 | 0.8 |
| | cutting edge angle α (°) | 90 | 90 | 90 | 90 | 90 |
| | clearance angle β (°) | 5 | 5 | 5 | 5 | 5 |
| | rake angle (°) | 5 | 5 | 5 | 5 | 5 |
| | ratio of front clearance (%) | 15 | 15 | 15 | 15 | 15 |
| | ratio of recess width (W2/W1) (%) | 60 | 60 | 60 | 60 | 60 |
| | ratio of recess depth (L1/D) (%) | 0 | 2 | 4 | 5 | 10 |
| evaluation | chip removability | poor | good | good | good | good |
| | cutting edge strength | good | good | good | good | fair | note 1: "Cutting edge angle (°)" refers to angle α formed by the drill axis (line O-O) and cutting edge 1.

note 2: "Ratio of front clearance (%)" refers to the ratio of the dimension of the front clearance in the direction along cutting edge 1, relative to the width (W1) of the cutting edge from the drill axis (line O-O) to the drill's outer peripheral end, supposing that W1 is 100%.

note 3: "Ratio of recess width (W2/W1) (%)" refers to the ratio of width W2 of the recess to the width (W1) of the cutting edge from the drill axis (line O-O) to the drill's outer peripheral end, supposing that W1 is 100%.

note 4: "Ratio of recess depth (L1/D) (%)" refers to the ratio of depth L1 of the recess to drill diameter D, supposing that D is 100%.

<Results of Evaluation>

Regarding Sample 2-2, Sample 2-3, and Sample 2-4, the ratio of the recess depth (L1/D) was not less than 2% and not more than 5%, and the chip removability and the cutting edge strength were high. Particularly regarding Sample 2-2 and Sample 2-3, the ratio of the recess depth (L1/D) was not less than 2% and not more than 4%, and the chip removability and the cutting edge strength were significantly high.

Regarding Sample 2-1, the recess was not formed in the cutting edge, and the chip removability was insufficient.

Regarding Sample 2-5, the ratio of the recess depth (L1/D) was 10%, and the cutting edge strength was insufficient.

It should be construed that embodiments and examples disclosed herein are given by way of illustration in all respects, not by way of limitation. It is intended that the scope of the present invention is defined by claims, not by the embodiments above, and encompasses all modifications and variations equivalent in meaning and scope to the claims.

INDUSTRIAL APPLICABILITY

The drill according to an aspect of the present invention is useful when used for sophisticated counterboring, cross-hole drilling, tapping, intermittent hole drilling, counterboring in an inclined surface, drilling in an inclined surface, counterboring in a cylindrical surface, drilling in a cylindrical surface, and the like.

REFERENCE SIGNS LIST 1 cutting edge; 1a recess; 2 margin; 3 rake face; 4 front clearance; 5 thinning portion; 6 flank face; 7 twisted flute; 8 body; 9 drill shank; 10 drill; 11 outer peripheral portion; 12 perpendicular

The invention claimed is:

1. A drill comprising:
   a cutting edge extending in a direction at an angle of not less than 85° and not more than 90° with respect to a drill axis;
   a flank face contiguous to the cutting edge and having a clearance angle of not less than 5° and not more than 10° with respect to a perpendicular to the drill axis; and
   a rake face located opposite to the flank face across the cutting edge,
      the cutting edge including a recess receding in a direction parallel to the drill axis,
      the rake face including a front clearance formed at a side of an outer periphery of the drill,
      the recess receding from the top of the cutting edge and forming an arc shape as the drill is seen sideways, wherein
   the rake face includes a thinning portion formed at a side of the drill axis,
   the thinning portion includes a linear portion and a curved portion as seen from above a tip of the drill, the linear portion is shaped to extend beyond the drill axis, and an outer end of the curved portion is located inside the outer periphery of the drill.

2. The drill according to claim 1, wherein the recess has a width of not less than 50% and not more than 70% of a width of a part of the cutting edge from the drill axis to an outer peripheral end of the drill.

3. The drill according to claim 1, wherein the recess has a depth of not less than 2% and not more than 5% of a diameter of the drill.

4. The drill according to claim 1, wherein the linear portion of the thinning portion is formed in parallel with the front clearance as seen from above the tip of the drill.

* * * * *